Figures 1, 2:
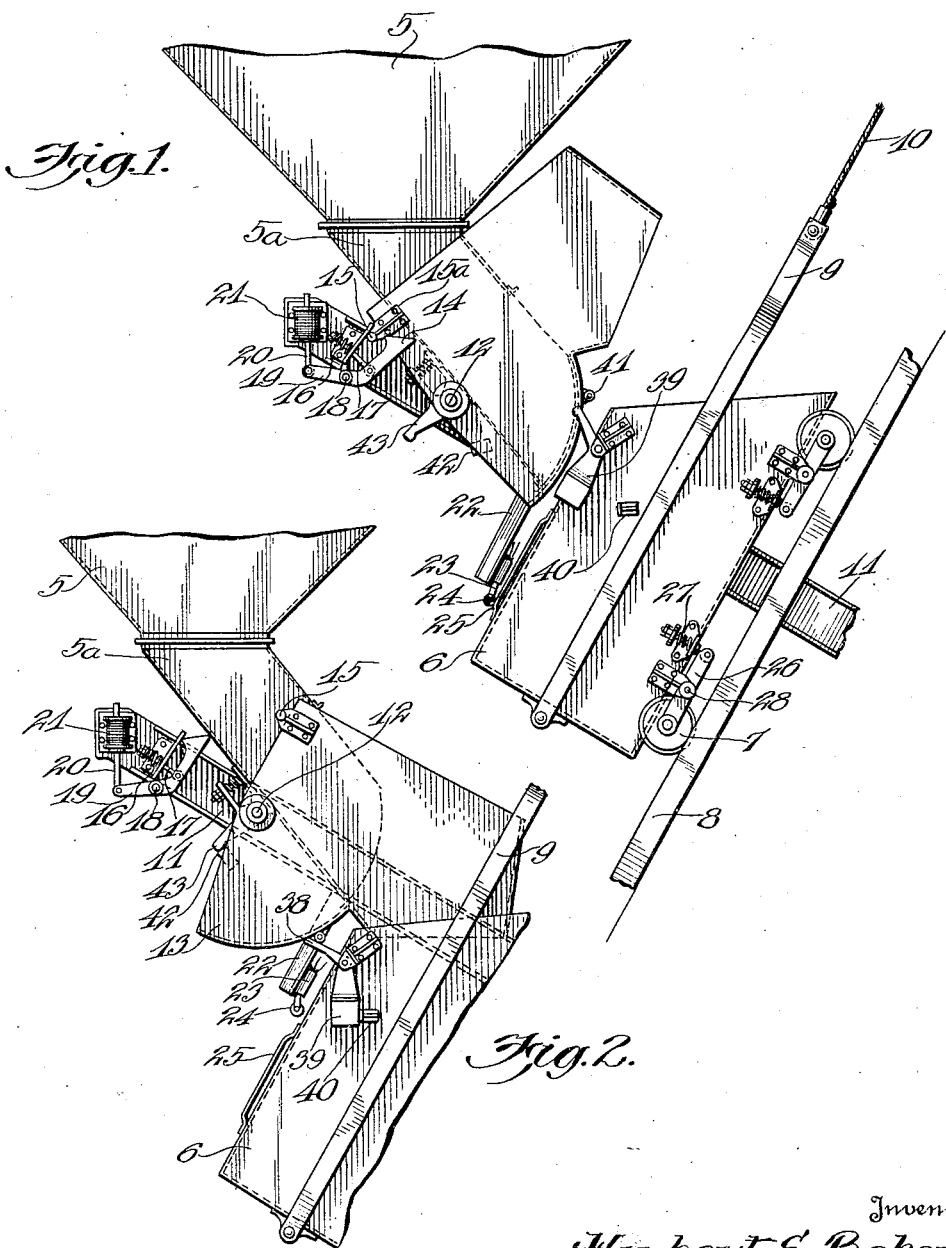

May 3, 1932. H. E. BAKER 1,856,942

ELECTRICAL GATE CONTROL

Original Filed May 28, 1929

Inventor:-
Hubert E. Baker

By Stevens and Batchelor
Attorneys.

Patented May 3, 1932

1,856,942

UNITED STATES PATENT OFFICE

HUBERT E. BAKER, OF CLEVELAND, OHIO, ASSIGNOR TO THE BRADY CONVEYORS CORPORATION, OF CHICAGO, ILLINOIS

ELECTRICAL GATE CONTROL

Original application filed May 28, 1929, Serial No. 366,630. Divided and this application filed January 8, 1931. Serial No. 507,471.

The present application is a division of my co-pending application Ser. No. 366,630, filed May 28, 1929.

My invention relates to skip loading apparatus and more particularly to the gates thereof, and my main object is to design the gate unit and the skip with a peculiar relation for automatic operation.

A further object of the invention is to provide the filling means with a gate which has no physical connection with the skip when loading the latter, so that slight variations in the positions of the gate or skip will not affect the filling operation.

A significant object of the invention is to provide a simple electrical control for the release of the filling gate from closed to open position.

A final but nevertheless important object of the invention is to build the apparatus of few and rugged parts which are durable and may operate for long periods without disorder or attention.

With the above objects in view and any others that may suggest themselves from the specification and claims to follow, a better understanding of the invention may be had by reference to the accompanying drawings, in which—

Fig. 1 is an elevation of the apparatus, in which the skip is shown near its bottom position; and Fig. 2 is a similar view showing the skip at the bottom position and the gate in loading position.

In the art of skip hoists the effort to render them automatically operative has led to timing devices and other appliances of a complicated and undependable nature. Thus, connections have been made between the skip and the loading gate wherein these parts are interdependent, and therefore hoisting elements necessarily required timing for the proper cooperation with the loading apparatus. Needless to say, difficulties have resulted from variations in the timing, so that the mechanism lacked harmony and efficiency; also, the question whether the skip would be fully or partially loaded when hoisted was problematical. It has therefore been my intention to depart from the difficulties and uncertainties of installations of the past and to provide an apparatus which functions freely and accomplishes the objects outlined to their fullest extent.

In carrying out the invention, 5 denotes the bin or hopper from which material is to be loaded into the skip 6. The latter is of conventional design and is wheeled as indicated at 7 to ride upon the inclined track 8 of the hoist. The usual bail 9 and lifting cable 10 apply to the skip 6.

The track 8 is provided with an inclined frame member 11 which extends alongside the hopper chute 5a and carries a side rod 12 on which is pivoted the gate 13 for the chute 5a. Figure 1 shows the latter closed by the lower portion of the gate and when the gate is swung in a clockwise direction to assume a position shown in Figure 2, the lower end of the chute 5a opens and secures communication by way of the gate with the skip 6, as clearly shown in Figure 2.

Under normal conditions, when the gate 13 maintains the chute 5a in closed position, a latch 14 retains a side pin 15 of a plate 15a mounted on the gate against departure, locking the gate in closed position. The latch is held by a spring 16 which draws upon a connecting rod 17 linked to the latch. The latch is fulcrumed at 18 to the frame member 11 and extends as indicated at 19 to make a connection with the armature 20 of a solenoid 21 also carried by the frame member 11, the function of the solenoid when energized being to draw upon the latch with the effect of opening the same relative to the pin 15 of the gate.

The frame member 11 carries a downward extension 22 which is fitted with a simple switch 23 which is closed by pressure upon a roller bearing lever 24. The skip has a cam 25 opposite the switch 23, and as the skip approaches bottom the cam 25 forces the lever 24 of the switch to close the latter with the effect that the switch 23 is in an electrical circuit with the solenoid and the closing of the switch energizes the solenoid with the effect of opening the latch 14. The weight of the gate 13 is so distributed that it will depart of itself from the closed position as soon as the pin 15 is released, and the gate will therefore swing in a clockwise direction and partly enter the skip 6 as shown in Figure 2.

With the gate open and in connection with the skip, the loading of the latter ensues, the weight of the skip from its load causing it to sink toward the track 8 by reason of a flexible connection between the skip and its wheels 7. As shown, the skip rests on cantilevers 26 drawn by springs 27 and fulcrumed in bearings 28 carried by skip plates 29. Thus, normally the skip is maintained in a high position relative to its wheels, but when weighted it sinks to a limited extent.

The skip carries on the side a plate 37 in which is pivoted a projecting lever 38 which is weighted below the pivot as indicated at 39. The skip also has a lug plate 40 to limit the lateral swing of the weight 39 and prevent the lever 38 from moving in a downward direction.

The gate 13 has a roller bearing lug 41 in the path of the lever 38 as the skip ascends, the effect of the lever upon the lug 41 being to impinge upon the same and thus swing the gate with a return motion for purposes of closing the chute 5a. The lever 38 and the lug 41 are so disposed that the gate will be swung slightly beyond its normal return position before the lever 38 can clear the lug 41 on the further ascent of the skip. The extended travel of the gate is represented by the advance of the gate pin 15 deeply into the latch 14 after it has wiped over the nose 14a of the latch. In doing this, the pin has forced the latch out, the latter immediately returning to closed position once the pin is within it. The weight of the gate then slightly swings it forward to locate the pin near the outlet of the latch.

When the skip again descends, the lever 38 simply trips under the lug 41 of the gate as shown in Figure 1, and then assumes the position of rest indicated in Figure 2.

In assuming the open or skip loading position, the gate is relieved of shock by being provided with a bumper pin 42 which strikes an angle lever 43 backed by a cushion spring 44 carried by the chute 5a. Thus, the swing of the gate to open position does not terminate with a shock.

It will be seen that the novel apparatus provides a freely assembled combination. The opening of the gate is accomplished freely by gravity as soon as the latch is opened; yet the gate is not made to open until the skip has descended to a receptive position. Since the gate follows the skip in this respect, a slight deviation in the height of either the gate or skip will not produce any disorder or hardship; in other words, the gate connects with the skip by a free and following action.

In designing the skip yieldable to load weight, I avoid actuating the switch 23 and again opening the latch 14 on the up-trip of the skip, since the weighted skip spaces the cam 25 from the lever 24 of the switch, so that no effect will be had on the switch or the latch controlled thereby. However, it is not necessary to weight the skip for the control of the latch; in fact, should the return trip of the cam 25 again throw out the latch, no work or harm will be done, as the cam will have passed the switch by the time the gate has swung back to a position affected by the latch. Or, the circuit of the solenoid could be designed for the operation of the switch only on the down course of the skip, so that the ascent of the skip will have no effect whatever upon the latch.

In conclusion, it may be said that the novel apparatus embodies a mechanism of few and simple parts which are of a rugged and dependable nature. The apparatus is devoid of complicated or frail parts and its electrical units for the circuits are of simple and dependable design.

I claim:

1. A skip loading apparatus comprising a hopper having an outlet, a gate for the latter tiltable from closed to open position, a projection carried by the gate, a latch adapted to receive the projection for retention and having clearance for an extended entry of the projection, a skip positioned for inclined travel opposite the gate, an abutment carried by the latter, and a lever carried by the skip and engageable on the ascent of the latter when the gate is tilted to restore the same to initial position, the lever clearing the abutment when the gate rises beyond the initial position by the operation of its projection in the clearance of the latch.

2. A skip loading apparatus comprising a hopper having an outlet, a gate for the latter tiltable from closed to open position, a projection carried by the gate, a latch adapted to receive the projection for retention whereby to lock the gate in closed position, electroresponsive means in proximity to the latch, a direct connection between said means and the latch whereby to release the latter when said means is energized, and a switch energizing said means when the skip is substantially at the bottom of its travel.

3. The structure of claim 2, said latch being medially pivoted, and said connection leading to that end portion of the latch which is opposite from the end designed to receive said projection.

4. The structure of claim 2, said connection being the armature of a solenoid.

5. The structure of claim 2, and yieldable means to move the latch into locking position when said electro-responsive means is inactive.

6. The structure of claim 2, said latch being medially pivoted, and a draw-spring element leading to the projection-receiving portion of the latch, said connection leading to the opposite end-portion of the latter.

In testimony whereof I affix my signature.

HUBERT E. BAKER.